Figure 1:
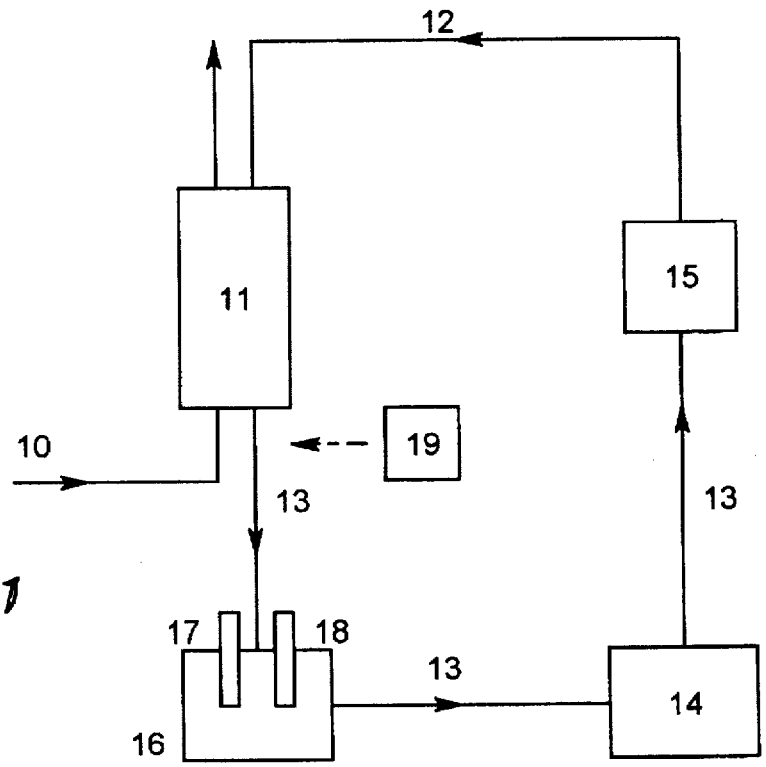

United States Patent [19]
Campbell et al.

[11] Patent Number: 5,670,036
[45] Date of Patent: Sep. 23, 1997

[54] METHOD FOR CONVERTING AMMONIA IN A GAS STREAM TO NITROGEN

[75] Inventors: Duncan Alistair Campbell, Whitby; Daniel Gilroy, Tarvin, both of United Kingdom

[73] Assignee: EA Technology Limited, Chester, United Kingdom

[21] Appl. No.: 545,649

[22] PCT Filed: May 5, 1994

[86] PCT No.: PCT/GB94/00958

§ 371 Date: Mar. 21, 1996

§ 102(e) Date: Mar. 21, 1996

[87] PCT Pub. No.: WO94/26395

PCT Pub. Date: Nov. 24, 1994

[30] Foreign Application Priority Data

May 7, 1993 [GB] United Kingdom ............... 9309408

[51] Int. Cl.$^6$ .................................................. C25B 1/24
[52] U.S. Cl. ........................... 205/499; 205/615; 205/763
[58] Field of Search ................................. 205/499, 763, 205/615

[56] References Cited

U.S. PATENT DOCUMENTS

| 4,081,345 | 3/1978 | Tölg et al. ..................... 204/195 T |
| 5,354,436 | 10/1994 | Van Velzen et al. et al. ......... 204/102 |

FOREIGN PATENT DOCUMENTS 2 104 548   3/1983   United Kingdom .

Primary Examiner—Arun S. Phasge
Attorney, Agent, or Firm—Westman, Champlin & Kelly, P.A.

[57] ABSTRACT

A process for converting ammonia in a gas stream to nitrogen comprises contacting the gas stream with an electrolyte containing bromide and hypobromite ions. The ammonia is dissolved and oxidized by the hypobromite ions to nitrogen. Thereafter the electrolyte is passed through an electrochemical cell containing an anode and a cathode to regenerate the hyperbromite ions by the action of an electric current flowing across the cell. The conversion of ammonia to nitrogen in accordance with the invention is adventageous as nitrogen may be disposed of without harm to the environment whilst ammonia has toxic effects.

10 Claims, 1 Drawing Sheet

METHOD FOR CONVERTING AMMONIA IN A GAS STREAM TO NITROGEN

The concentrations of ammonia, in both liquid and gaseous phases, that may be discharged into the environment are limited by legislation. The criteria may present severe operational problems in sewage treatment plants. The invention relates to a method for converting ammonia in a gas stream into nitrogen, which is, of course, a non-toxic and harmless product. Liquids may be subjected to conventional gas stripping to transfer the ammonia into the gaseous phase, thus enabling a common approach to both effluent types to be considered.

Many oxidising agents are known to convert ammonia to nitrogen, but a product mixture is often obtained. Resulting species such as nitrates, nitrites, and nitrogen oxides are undesirable. Apparently, the hypobromite ion ($BrO^-$), in aqueous solution, gives only nitrogen, in accordance with equation (1), and is therefore a preferred reagent.

$$3BrO^- + 2NH_3 \rightarrow N_2 + 3H_2O + 3Br^- \quad (1)$$

The bromide ion ($Br^-$) so produced may be oxidised back to hypobromite at the anode of an electrochemical cell in accordance with equation (2)

$$Br^- + H_2O \rightarrow BrO^- + 2H^+ + 2e \quad (2)$$

These reactions have been used by Van Velzen et al (EP-A-0 412 175) in a method designed to remove nitrogen oxides or nitrates from an effluent. Ammonia which was formed by reducing such compounds cathodically, passed through a membrane dividing the electrochemical cell. The ammonia was then converted to nitrogen by hypobromite generated continually at the anode. In practice the scheme has fundamental drawbacks which lead to a reduction in efficiency. For example, it is not possible to balance the rate of ammonia transport across the membrane with that of hypobromite formation at the anode. In fact, hypobromite will always be present in considerable excess. This allows the unwanted side reaction of bromate formation in accordance with equation (3) to occur.

$$BrO^- + 2H_2O \rightarrow BrO_3^- + 4H^+ + 4e \quad (3)$$

Reaction (3) reduces the overall current efficiency. At the same time, in a divided cell, the anolyte will become acidic, and bromide ions will be oxidised to elemental bromine:

$$2Br^- \rightarrow Br_2 + 2e \quad (4)$$

Bromine does not react readily with ammonia, and may also be lost from the cell as vapour.

The present inventors have investigated this subject with a view to overcoming the above-mentioned disadvantages and have discovered that an efficient method can be operated in such a way that either the ammonia or the hypobromite in the solution is present in only a slight excess. Reaction (1) is sufficiently rapid for this to be feasible.

The present invention provides a process for converting ammonia in a gas stream to nitrogen, which process comprises contacting the said gas stream with an electrolyte containing bromide and hypobromite ions to dissolve ammonia and to cause oxidation of the dissolved ammonia to produce nitrogen by oxidation with hypobromite ions, and thereafter passing the said electrolyte through an electrochemical cell containing an anode and a cathode so that hypobromite ions are regenerated by the action of the electric current flowing across the cell, wherein said current is switched on or off according to whether the potential difference between a standard reference electrode and a sensing electrode which is immersed in the electrolyte at the exit to the cell or an electrolyte holding tank is greater than or less than a fixed value so that ammonium or hypobromite ions are present in only a slight excess.

Preferably the gaseous and electrolyte streams are contacted in co-current or counter-current flow in an absorption tower packed with inert material to provide a large contact area. It is preferred that the gaseous and electrolyte streams are contacted in co-current or counter-current flow in the electrochemical cell; and for this procedure the anode of said electrochemical cell may comprise a bed of conducting carbon or graphite chips, the said bed being in contact with an anode feeder plate, and the said bed being separated from the cathode by a porous cloth comprised of an inert non-conducting material, such as polypropylene.

In operating the process of the invention the electrolyte may be circulated by means of a pump in a loop comprising the cell, the external contactor, if this is present, and a holding tank for said electrolyte. The electrolyte may contain a buffering salt, such as potassium di-hydrogen phosphate, to maintain the pH of the electrolyte between 7 and 9.

The current passing through the electrochemical cell is switched on or off according to whether the potential difference between a standard reference electrode and a sensing electrode, which is immersed in the electrolyte at the exit to the cell or in the holding tank, is greater than or less than a fixed value so that ammonia or hypobromite is present only in a slight excess. The slight excess of the ammonium ions may be up to 1 millimolar and is preferably less than 0.5 millimolar. The slight excess of the hypobromite ions may be up to 5 millimolar and is preferably less than 1 millimolar.

The preferred anode is conducting carbon or graphite and the preferred cathode is stainless steel and it is preferred that the current efficiency of the conversion of ammonia to nitrogen with the process of this invention exceeds 90%.

The invention will now be described with reference to the process flowsheet illustrated schematically in FIGS. 1 and 2 of the drawings.

A gaseous stream 10, including the ammonia, is introduced into the bottom of an absorption tower 11. Aqueous electrolyte containing bromide and hypobromite ions is pumped through line 12 to the top of the tower 11. As the aqueous electrolyte flows downwards in the tower 11, ammonia is transferred from the gaseous to the liquid phase.

The aqueous electrolyte with the ammonia dissolved therein, after exiting the tower 11, passes through line 13 into an undivided electrochemical cell 16 and through connecting line 13 into holding tank 14, the solution is removed from tank 14 through line 13 by pump 15. The solution liquid is returned through line 12 to the absorption tower 11. Gas may be vented periodically from holding tank 14.

Cell 16 comprises an anode 17 and cathode 18. Hypobromite is generated in the cell 16 at anode 17.

The described system can be operated in two ways, and may be monitored by a sensing electrode 19 placed in contact with the solution after it exits the absorption tower 11, at point 19 in FIG. 1. These two ways of operation are:
(a) with an excess of hypobromite at the exit of absorption tower 11 when reaction (1) will take place in the tower 11, i.e. ammonia will be immediately oxidised to nitrogen as it transfers from the gaseous stream into the electrolyte; and
(b) with excess ammonia at 19, reaction (1) will occur in the electrochemical cell 16, adjacent to the anode 17, where hypobromite is formed. The following practical points are to be taken into account:

(1) If the electrolyte is pumped rapidly around the system, an excess of either ammonia or hypobromite can be minimised.
(2) Since the cell is undivided the solution pH of the electrolyte will not change appreciably. Protons generated at the anode will be reduced to hydrogen gas at the cathode.
(3) Similarly, any bromate formed will also be reduced at the cathode, thus minimising any loss of hypobromite, the effective reagent.
(4) The sensing electrode may be used to control the process by switching the current on and off. In this way various uptake rates of ammonia may be accommodated. The sensing electrode can be chosen to respond to the concentration of ammonia, or to the redox potential of $Br^-/BrO^-$.

In one embodiment of the invention the stripping tower may be combined with the electrochemical cell, if the anode takes the form of a bed of conducting particles. The gaseous and electrolyte streams could then be introduced into the cell in either co-current or counter-current flow mode. The ammonia would then transfer into the electrolyte, and react in situ with hypobromite generated anodically by the passage of current. The process may be controlled, as with the above-described method by a sensing electrode at the cell exit. Apparatus for carrying out this method is now described with reference to FIG. 2 of the drawing.

Figure 2:
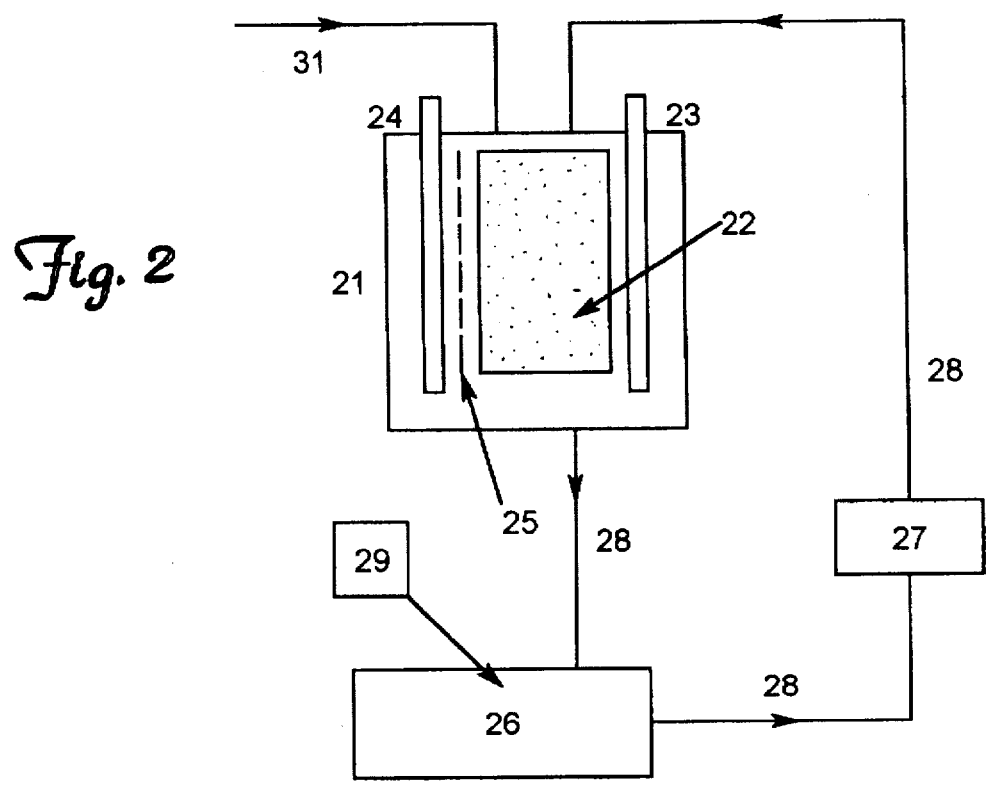

In FIG. 2, the electrochemical cell 21 incorporates an anode 22 of carbon or graphite chips with a typical chip dimension of about 3 mm; the chips occupy the main body of the cell 21. Current is supplied by means of a carbon anode feeder plate 23 against which the chips which constitute the anode 22 are packed. The cathode 24 consists of a stainless steel plate. A porous mesh cloth 25 of an inert non-conducting material, such as polypropylene, prevents the carbon particles of the anode from contacting the cathode, and thereby causing a short circuit. However electrolyte passes through the cloth to provide ionic conduction across the cell.

The electrolyte consists of a solution of NaBr (0.5M) containing $K_2HPO_4$ (0.1M) to give a buffered pH of about 8.0. The electrolyte is circulated in a closed loop through the cell 21 and an intermediate holding tank 26 by means of pump 27 through the connecting lines 28. The gas stream containing ammonia is introduced into the cell 21 through line 31.

The two streams, i.e. the gas stream and the circulated electrolyte, may enter the cell 21 at either the top or the bottom, and may be in co-current or counter-current mode. A most convenient arrangement is to have top entry and bottom exit ports, as shown in FIG. 2. The anode particles are therefore in contact with a mixture of gas and liquid flows. Direct current is passed through the cell via contacts (not shown) to the anode feeder plate 23 and the cathode 24.

A monitoring electrode 29 may be positioned in line 28 near the cell exit, or in the holding tank 26. An ammonia electrode or a redox electrode responding to the $BrO^-/Br^-$ ratio may be used as the monitoring electrode. Both types of monitoring electrodes are commercially available and produce potential measurements against a stable reference electrode. The output of the monitoring electrode/reference electrode system drives a controller (not shown) which turns the cell current on or off as required. The concentration of the species so monitored is thereby controlled, thus ensuring efficient operation.

EXAMPLES

In the following examples, the gas stream containing ammonia was generated as follows. The pH of 500 ml of a solution of ammonium sulphate (0.05M) was adjusted to about 12 with sodium hydroxide. An air flow of 1 liter/min was bubbled through the solution, which was maintained at about 50° C. Analysis of the liquor at intervals enabled the quantities of ammonia introduced into the gas phase and subsequently into the electrochemical cell to be calculated. The gas phase concentration of ammonia was about 1% by volume in the initial stages of an experiment.

The electrochemical cell and electrolyte were as described above with reference to FIG. 2. Gas and liquid flows entered the cell 21 at the top, and exited at the bottom. The areas of the cathode and of the anode feeder plate were 100 $cm^2$. The graphite chips had a typical dimension of about 3 mm, and the bed thickness from feeder plate to separator cloth was 10 mm. The electrolyte volume was 1 liter, and the flow rate 30 liter/hr. Reference electrode 29 used for current control was placed in the holding tank 26. The cell current was integrated to give the total charge passed as a function of time.

EXAMPLE 1

The process was controlled with a redox electrode sensitive to the hypobromite concentration, and a slight excess of this ion was always present. The cell current (2 A) was switched off when the redox potential registered above 580 mV, and switched on when it fell below that value. The results of Table 1 were obtained.

TABLE 1

| Elapsed Time (min) | NH₃ Generated (mmoles) | Total Charge (Coulomb) | Total Current Efficiency (%) |
| --- | --- | --- | --- |
| 30 | 7.7 | 2311 | 97 |
| 60 | 12.4 | 4023 | 89 |
| 90 | 16.5 | 5770 | 83 |
| 120 | 21.7 | 7450 | 84 |
| 150 | 27.6 | 8304 | 96 |
| 180 | 29.6 | 9152 | 94 |
| 240 | 35.1 | 10868 | 94 |
| 270 | 37.8 | 11552 | 95 |
| 300 | 39.0 | 11958 | 95 |
| 330 | 41.6 | 12548 | 96 |
| 360 | 43.1 | 12933 | 97 |
| 420 | 44.3 | 13325 | 97 |
| 480 | 44.5 | 13623 | 97 |

As the ammonia in the generating solution is depleted, the amount of $N_2$ and bromide produced per unit time become less. Current efficiencies for oxidation are high, but slightly below 100%. Although the concentration of hypobromite is below 1 millimolar, some may be reduced at the cathode.

EXAMPLE 2

The current in the electrochemical cell (21) was controlled with an ammonia sensitive electrode in the holding tank (26) with a switching potential of 160 mV. Other conditions were as before in Example 1, and the results are shown in Table 2.

TABLE 2

| Elapsed Time (min) | NH₃ Generated (mmoles) | Total Charge (Coulomb) | Total Current Efficiency (%) |
| --- | --- | --- | --- |
| 30 | 6.5 | 2198 | 86 |

TABLE 2-continued

| Elapsed Time (min) | NH₃ Generated (mmoles) | Total Charge (Coulomb) | Total Current Efficiency (%) |
|---|---|---|---|
| 60 | 13.6 | 3900 | 100 |
| 90 | 19.5 | 5581 | 101 |
| 150 | 28.3 | 8066 | 101 |
| 180 | 31.4 | 9090 | 101 |
| 210 | 34.9 | 9892 | 102 |
| 240 | 37.7 | 10641 | 102 |
| 270 | 39.8 | 11242 | 104 |
| 300 | 41.6 | 11929 | 102 |

In this example ammonia is present in slight excess; measurements on the electrolyte gave values for ammonia of between 0.15 and 0.5 millimolar. In the previous example they were below 0.05 millimolar. In this example, it is therefore possible that small amounts of ammonia escape from the electrolyte and increase the apparent current efficiency to over 100%.

The advantages of keeping the reactant concentrations, i.e. ammonium and hypobromite ions, low are:

(a) to prevent ammonia loss as vapour, and
(b) to minimise the further oxidation of hypobromite to bromate (Reaction 3)

We claim:

1. A process for converting ammonia in a gas stream to nitrogen, which process comprises contacting the said gas stream with an electrolyte containing bromide and hypobromite ions to dissolve ammonia and to cause oxidation of the dissolved ammonia to produce nitrogen by oxidations with hypobromite ions, and thereafter passing the said electrolyte through an electrochemical cell containing an anode and a cathode so that hypobromite ions are regenerated by the action of the electric current flowing across the cell, wherein said current is switched on or off, according to whether the potential difference between a standard reference electrode and a sensing electrode, which is immersed in the electrolyte at the exit to the cell or an electrolyte holding tank, is greater than or less than a fixed value so that ammonium or hypobromite ions are present in only a slight excess of up to 1 millimolar and 5 millimolar respectively.

2. A process as claimed in claim 1, in which the gaseous and electrolyte streams are contacted in co-current or counter-current flow in an absorption tower packed with inert material to provide a large contact area.

3. A process as claimed in claim 1, in which the anode is conducting carbon or graphite and the cathode is stainless steel.

4. A process as claimed in claim 1, in which the gaseous and electrolyte streams are contacted in co-current or counter-current flow in the in electrochemical cell.

5. A process as claimed in claim 1, in which the anode of the said electrochemical cell comprises a bed of chips of conducting carbon or graphite, the said bed being in contact with an anode feeder plate, and the said bed being separated from the cathode by a porous cloth comprised of an inert con-conducting material.

6. A process as claimed in claim 1, in which the electrolyte is circulated by means of a pump in a loop comprising the cell and the holding tank.

7. A process as claimed in claim 1, in which the electrolyte contains a buffering salt to maintain the pH of the electrolyte between 7 and 9.

8. A process as claimed in claim 1, in which the sensing electrode responds to the redox potential of the bromide hypobromite couple, such that the electrolyte then maintains a slight excess of hypobromite ions of up to 5 millimolar, and the ammonium concentration is at a low value of less than 1 ppm.

9. A process as claimed in claim 1, in which the sensing electrode responds to the concentration of ammonia, such that the electrolyte maintains a slight excess of ammonium ions, of less than 10 ppm, and a low concentration of hypobromite ions of less than 1 millimolar.

10. A process as claimed in claim 1, wherein the current efficiency of the conversion of ammonia to nitrogen exceeds 90%.

* * * * *

UNITED STATES PATENT AND TRADEMARK OFFICE
CERTIFICATE OF CORRECTION

PATENT NO. : 5,670,036
DATED : September 23, 1997
INVENTOR(S) : Duncan A. Campbell et al.

It is certified that error appears in the above-indentified patent and that said Letters Patent is hereby corrected as shown below:

Claim 4, line 3, cancel "in" (second occurrence).

Signed and Sealed this

Twenty-third Day of June, 1998

Attest:

BRUCE LEHMAN

Attesting Officer

Commissioner of Patents and Trademarks